Jan. 16, 1923.
C. W. MARTIN ET AL.
DIRIGIBLE HEADLIGHT.
FILED MAY 26, 1922.
1,442,490
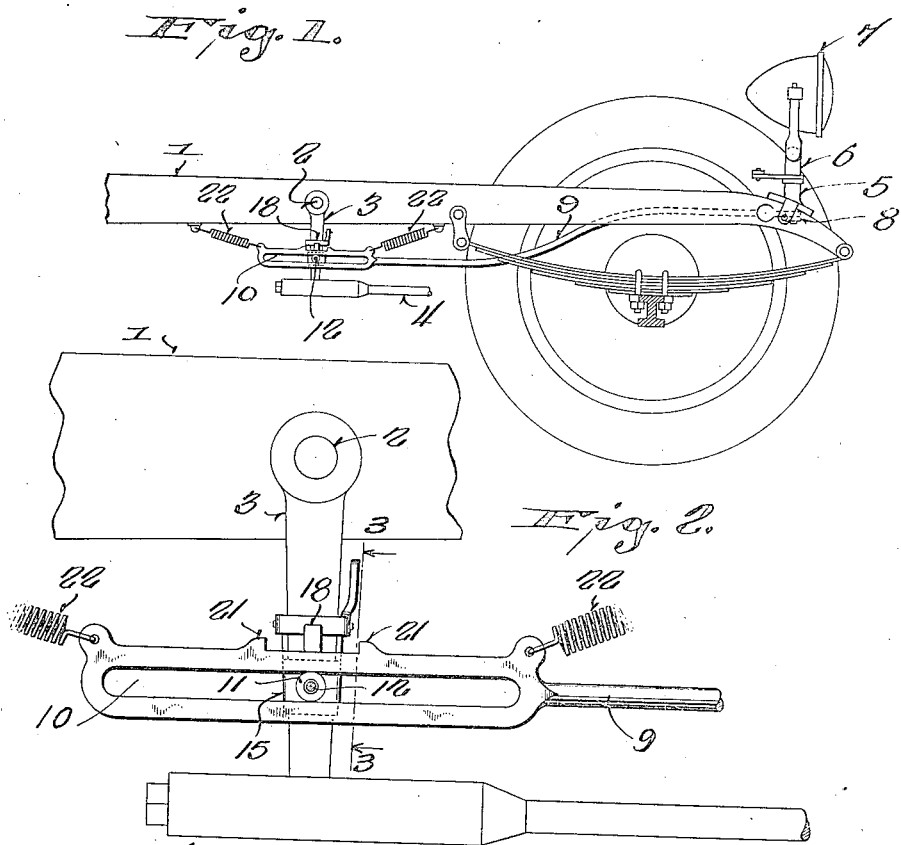
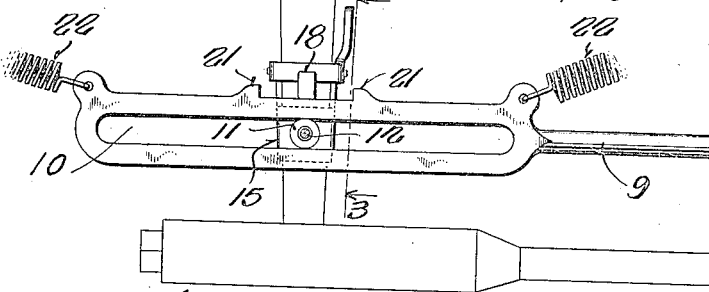
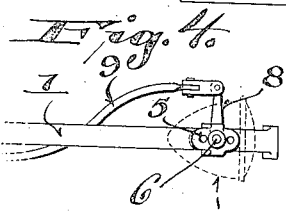
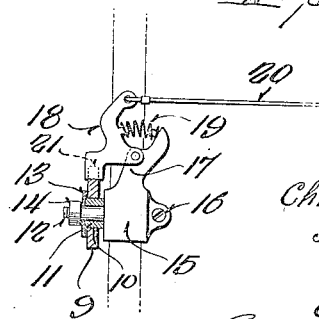
Witnesses:
R. E. Weber
Inventors:
Christopher W. Martin
Myron F. Allen
By
Attorneys Patented Jan. 16, 1923.

1,442,490

UNITED STATES PATENT OFFICE.

CHRISTOPHER W. MARTIN AND MYRON F. ALLEN, OF KENOSHA, WISCONSIN; SAID ALLEN ASSIGNOR TO SAID MARTIN.

DIRIGIBLE HEADLIGHT.

Application filed May 26, 1922. Serial No. 563,838.

*To all whom it may concern:*

Be it known that we, CHRISTOPHER W. MARTIN and MYRON F. ALLEN, both citizens of the United States, and residents of Kenosha, in the county of Kenosha and State of Wisconsin, have invented certain new and useful Improvements in Dirigible Headlights; and we do hereby declare that the following is a full, clear, and exact description thereof.

This invention pertains to dirigible headlights for motor vehicles, and more particularly to a headlight adapted to oscillate in a horizontal plane in synchrony with the movement of the front wheels.

The primary object of the invention resides in the provision of means for selectively connecting or disconnecting the lamps with the steering mechanism of the vehicle, whereby the lamps are shifted by the same, or remain in their normal position when desired.

A more specific object incidental to the foregoing resides in the provision of a mechanism of this character, which is devoid of the usual multiplicity of parts, and which may be attached to a vehicle of any conventional type of steering mechanism, without altering the same.

With the foregoing and other objects in view, which will be more apparent as the description proceeds, the invention consists in what is herein shown and described and more particularly pointed out and defined by the appended claims.

It will be understood that the accompanying drawing illustrates but one mode of carrying out the present invention, and that various modifications in structural details are contemplated as within the appended claims.

In the drawings,

Figure 1 is a fragmentary view of a portion of a conventional automobile chassis, showing one method of applying the invention thereto.

Figure 2 is an enlarged view showing the connection between the lamp actuated means and the steering mechanism, Figure 3 is a detailed sectional view taken on the line 3—3 of Figure 2, and Figure 4 is a detailed sectional view taken on the line 4—4 of Figure 1.

Referring now more particularly to the accompanying drawings, the numeral 1 designates the frame of a conventional automobile chassis, which frame carries a steering mechanism comprising a rocker shaft 2, on which is secured the depending steering arm 3, the end of which is universally connected to the steering link 4, that actuates the front wheels of the vehicle.

Mounted on the front end of the frame 1, or to any other suitable part of the vehicle, is a lamp standard 5, in which the lamp bracket 6 is pivotally supported. Secured to the arms of the bracket 6 is a conventional headlight 7.

For the purpose of oscillating the bracket 6 within the standard 5, the lower end of the bracket is provided with a laterally extended arm 8, to which a link 9 is universally connected. The opposite end of the link 9 is provided with an elongated slot 10, adapted to receive the guide roller 11, which is mounted on the stud 12. A retaining washer 13 is secured on the stud by a nut 14, and serves to retain the roller 11 and the slotted end of the link 9. The stud 12 is carried by a split clamp 15 adapted to be secured on the steering arm 3, by means of a screw 16.

The clamp 15 is provided with a pair of upwardly extending ears 17, to which is pivoted a dog 18, adapted to selectively engage or disengage the link 9 to operatively connect the same to the rocker arm, or cause it to be released when it is desired to maintain a normal position of the lamps. The dog 18 is normally urged into engagement by a spring 19, and is released by means of the cable 20, which is manually operable from any convenient place in the vehicle.

In order to prevent slight movement of the steering mechanism from being transmitted to the lamps, the lugs 21, which project from the link 9 and are engaged by the dog 18, are slightly spaced apart to permit movement of the dog, without affecting the link, the latter being held in its normal position by a pair of oppositely disposed coil springs 22, secured to the link and to the frame 1 of the vehicle.

From the foregoing it will be seen that the entire lamp actuating mechanism can be readily and easily attached to the vehicle by simply tightening the clamp 15 to the steering arm 3, thus eliminating the necessity of drilling holes and other cumbersome mechanical operations, such as are often required in attaching devices of this character.

In the operation of the device, slight play of the steering arm is permitted because of the spaced lugs 21, projecting from the link 9, and during this play or movement of the steering arm, the link 9, and consequently the lamp is yieldably held in its normal position by means of the springs 22. Upon turning a corner where a comparatively long movement of the steering arm is required, the dog 18 will engage one of the lugs and thus actuate the link 9, causing the lamps to be oscillated on a horizontal plane in the direction of the front wheels.

In the event that the operator desires to maintain the normal direction of the lamps, the dog 18, by means of the cable 20, is disengaged from the link 9, thus permitting free movement of the steering arm 3 without affecting the link.

From the foregoing it will be appreciated that a very simple and efficient arrangement has been provided, whereby the lamps may be oscillated in synchrony with the movement of the front wheels or disengaged from the actuating means and held in their normal position at the selection of the operation.

We claim:

1. The combination of a vehicle provided with a steering mechanism, a dirigible headlight pivoted for horizontal movement, a link for oscillating said headlight, and provided with an elongated slot in one of its ends, a clamp carried by the steering mechanism and provided with a stud adapted to project into said slot, a spring dog pivoted to said clamp and normally engaging the link and yieldable means for holding the link in normal position.

2. The combination of a vehicle provided with a steering mechanism, a dirigible headlight pivoted for horizontal movement, a link for oscillating said headlight, a clamp carried by the steering mechanism, a slidable connection between the link and clamp, a spring dog pivoted to said clamp and normally engaging the link, stops on the link adapted to engage and permit relative movement of the dog, and yieldable means for holding the link in normal position.

In testimony that we claim the foregoing we have hereunto set our hands at Kenosha, in the county of Kenosha and State of Wisconsin.

CHRISTOPHER W. MARTIN.
MYRON F. ALLEN.